United States Patent
Tsai

(10) Patent No.: US 11,220,052 B2
(45) Date of Patent: Jan. 11, 2022

(54) THREE-DIMENSIONAL PRINTING APPARATUS

(71) Applicant: YOUNG OPTICS INC., Hsinchu (TW)

(72) Inventor: Chien-Hsing Tsai, Hsinchu (TW)

(73) Assignee: YOUNG OPTICS INC., Hsinchu (TW)

( * ) Notice: Subject to any disclaimer, the term of this patent is extended or adjusted under 35 U.S.C. 154(b) by 473 days.

(21) Appl. No.: 16/189,365

(22) Filed: Nov. 13, 2018

(65) Prior Publication Data

US 2019/0143591 A1 May 16, 2019

(30) Foreign Application Priority Data

Nov. 13, 2017 (TW) ................. 106139202

(51) Int. Cl.
| | |
|---|---|
| *B29C 64/245* | (2017.01) |
| *B29C 64/227* | (2017.01) |
| *B33Y 30/00* | (2015.01) |
| *B29C 64/124* | (2017.01) |

(52) U.S. Cl.
CPC .......... *B29C 64/245* (2017.08); *B29C 64/227* (2017.08); *B29C 64/124* (2017.08); *B33Y 30/00* (2014.12)

(58) Field of Classification Search
None
See application file for complete search history.

(56) References Cited

U.S. PATENT DOCUMENTS

| | | |
|---|---|---|
| 7,195,472 B2 | 3/2007 | John |
| 8,372,330 B2 | 2/2013 | El-Siblani et al. |
| 2016/0016361 A1* | 1/2016 | Lobovsky .............. B33Y 10/00 264/308 |

FOREIGN PATENT DOCUMENTS

| | | | |
|---|---|---|---|
| CN | 106827512 A | * | 6/2017 |
| TW | M521203 U | | 5/2016 |
| TW | 201722693 A | | 7/2017 |

OTHER PUBLICATIONS

Machine English Translation of CN-106827512-A, Accessed Feb. 19, 2021 (Year: 2017).*
Intellectual Property Office of the Republic of China, Office Action, dated Feb. 25, 2019, 11 pages.

* cited by examiner

*Primary Examiner* — Abbas Rashid
*Assistant Examiner* — Adrianna N Konves
(74) *Attorney, Agent, or Firm* — Muncy, Geissler, Olds & Lowe, P.C.

(57) ABSTRACT

One embodiment of the invention provides a three-dimensional printing apparatus including a light-transmissive plate having a first surface, a platform, a support frame, a supporting seat and a rotating shaft. The platform is disposed above the light-transmissive plate, and the support frame is disposed under the light-transmissive plate. The supporting seat is disposed under the support frame and defines an accommodation space under the light-transmissive plate for accommodating an image light source. The rotating shaft pivots on a point inside or on the support frame and has a shaft center, and the shaft center is disposed under an extending plane extending from the first surface.

19 Claims, 3 Drawing Sheets

THREE-DIMENSIONAL PRINTING APPARATUS

BACKGROUND OF THE INVENTION a. Field of the Invention

The invention relates generally to a three-dimensional printing apparatus, and more particularly to a three-dimensional printing apparatus that realizes the release of a printed workpiece through rotational movement.

b. Description of the Related Art

In a pull-up type three-dimensional printing apparatus, a workpiece may be released and separated from a light-transmissive plate beneath the workpiece by moving the light-transmissive plate, thus allowing the printing process to proceed with a subsequent layer.

In a conventional design, a rotating shaft and a light-transmissive plate are disposed in substantially the same plane. Therefore, when the light-transmissive plate rotates, an initial acceleration may be generated in a direction perpendicular to the workpiece to cause a normal drag force acting between the workpiece and the light-transmissive plate. Such drag force applied in the normal direction may damage the workpiece and result in an unsatisfactory release performance.

BRIEF SUMMARY OF THE INVENTION

According to one aspect of the present disclosure, a three-dimensional printing apparatus includes a light-transmissive plate having a first surface, a workpiece holder, a supporting seat, a rotating shaft and a mechanical element. The workpiece holder is disposed on a first side of the light-transmissive plate, and the supporting seat is disposed on a second side of the light-transmissive plate and defines an accommodation space for accommodating an image light source. The rotating shaft has a shaft center, and a minimum distance measured in a direction perpendicular to the first surface and between the shaft center and an extending plane extending from the first surface is larger than 3 cm. A first end of the mechanical element is connected to the light-transmissive plate, and a second end of the mechanical element pivots on the rotating shaft. In the above aspect where a minimum distance measured in a direction perpendicular to the first surface (such as a top surface of the light-transmissive plate) and between the shaft center and an extending plane is larger than 3 cm, when the workpiece holder moves away from the light-transmissive plate, a workpiece may be subject to both a force component applied in a normal direction and a force component applied in a lateral direction to facilitate the release of the workpiece from the workpiece holder.

According to another aspect of the present disclosure, a three-dimensional printing apparatus includes a light-transmissive plate having a first surface, a platform, a support frame, a supporting seat and a rotating shaft. The platform is disposed above the light-transmissive plate, and the support frame is disposed under the light-transmissive plate. The supporting seat is disposed under the support frame and defines an accommodation space under the light-transmissive plate for accommodating an image light source. The rotating shaft pivots on a point inside or on the support frame and has a shaft center, and the shaft center is disposed under an extending plane extending from the first surface. In the above aspect, since the shaft center is disposed under the extending plane extending from the first surface, when the support frame rotates about the rotating shaft, two components of forces may respectively act on the workpiece in different directions to improve release performance of the workpiece.

Other objectives, features and advantages of the invention will be further understood from the further technological features disclosed by the embodiments of the invention wherein there are shown and described preferred embodiments of this invention, simply by way of illustration of modes best suited to carry out the invention.

BRIEF DESCRIPTION OF THE DRAWINGS

FIG. 1A shows a state of the printing apparatus before it operates and FIG. 1B shows a state of the printing apparatus during operation.

DETAILED DESCRIPTION OF THE INVENTION

In the following detailed description of the preferred embodiments, directional terminology, such as "top," "bottom," "front," "back," etcetera, is used with reference to the orientation of the Figure(s) being described. The components of the invention can be positioned in a number of different orientations. As such, the directional terminology is used for purposes of illustration and is in no way limiting. Further, "First," "Second," etcetera, as used herein, are used as labels for nouns that they precede, and do not imply any type of ordering (e.g., spatial, temporal, logical, etcetera).

Figure 1A:
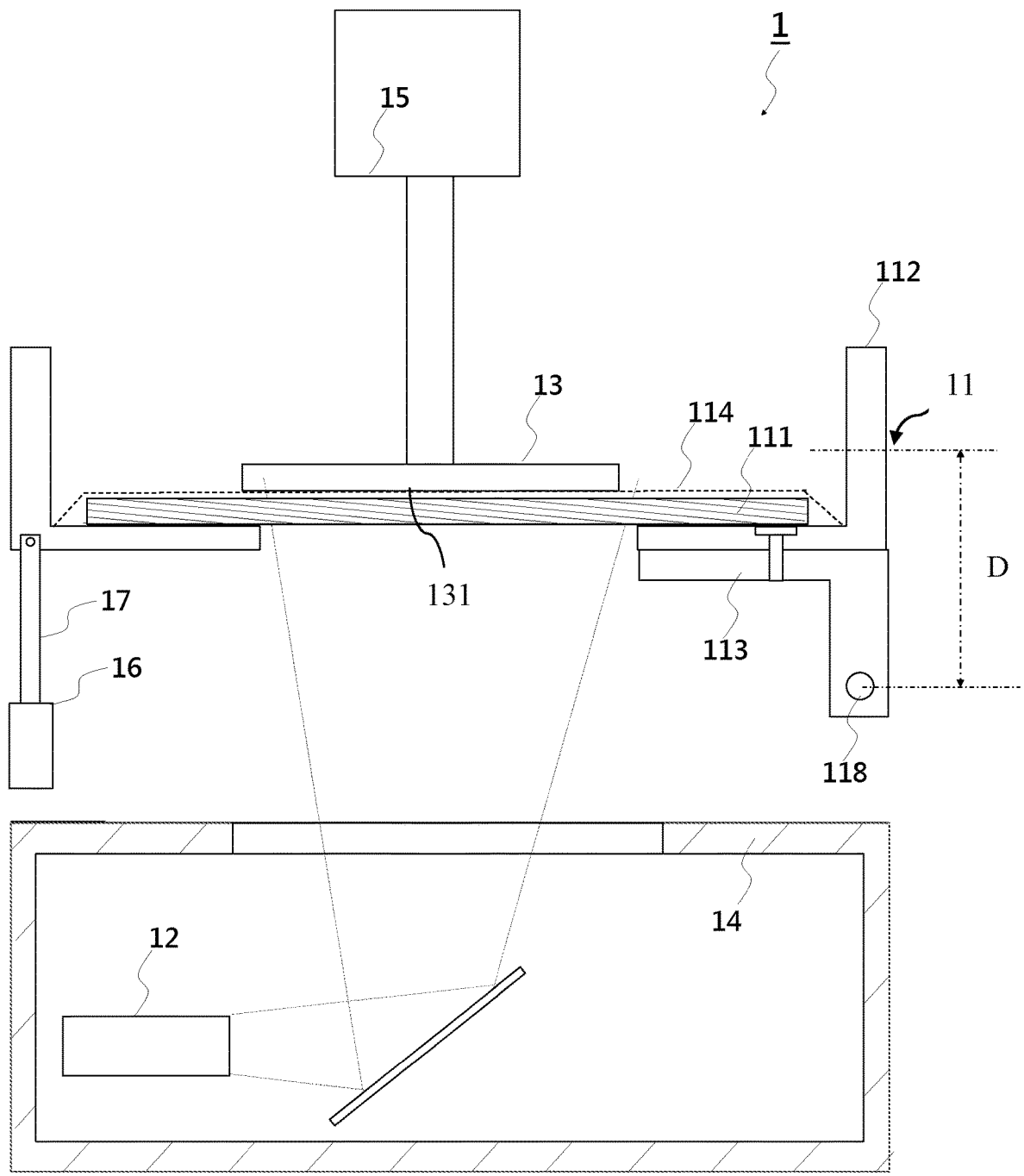
FIG. 1A and FIG. 1B illustrate a three-dimensional printing apparatus according to an embodiment of the invention, where
Figure 1B:
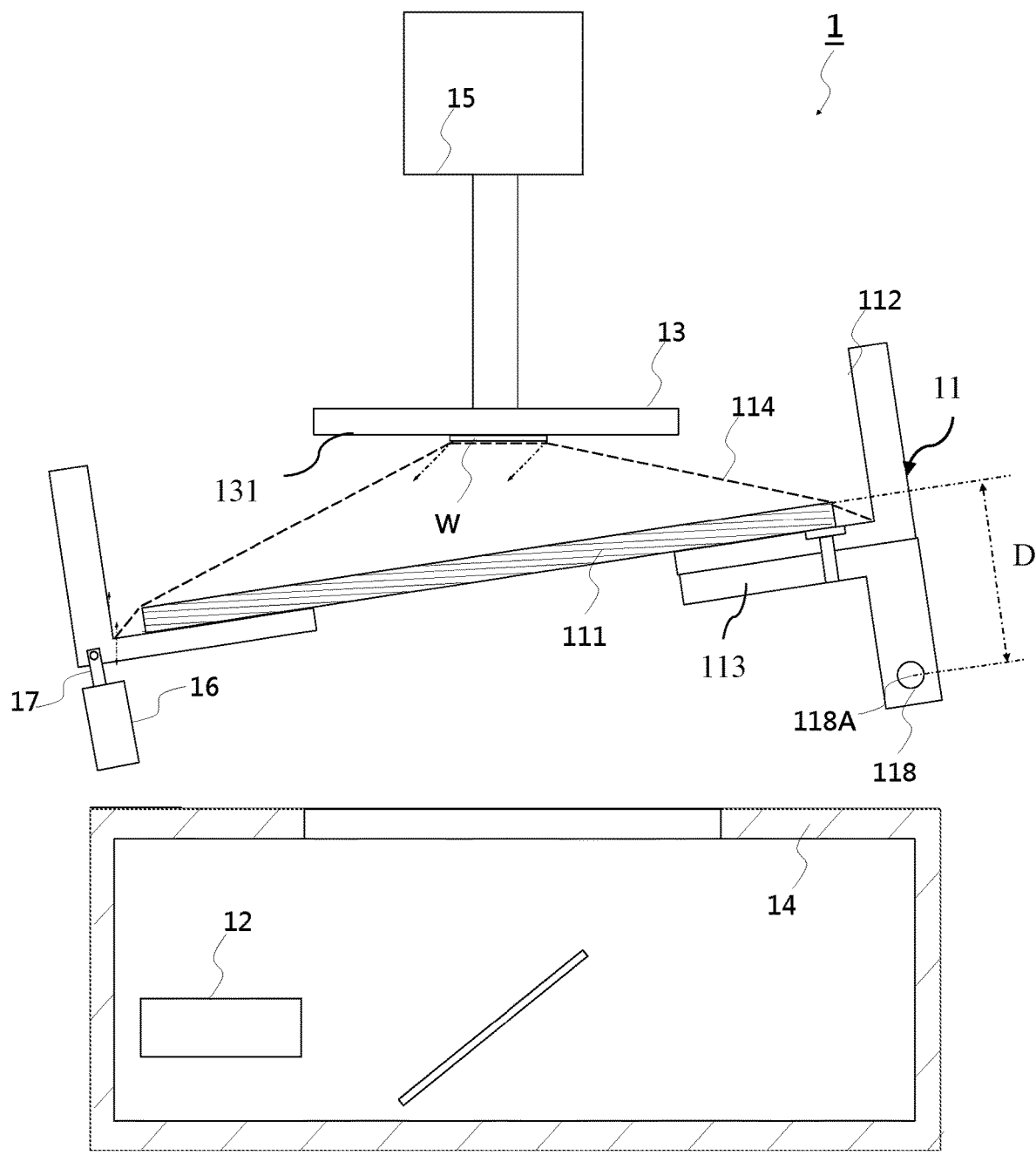

FIG. 1A and FIG. 1B illustrate a three-dimensional printing apparatus according to an embodiment of the invention, where FIG. 1A shows a state of the printing apparatus before it operates and FIG. 1B shows a state of the printing apparatus during operation. In this embodiment, the three-dimensional printing apparatus 1 includes a material tank 11, an image light source 12, a workpiece holder 13, a supporting seat 14, a drive device 15, an actuator 16, and an actuated element 17. When the workpiece holder 13 moves away from a light-transmissive plate 111, a support frame 113 rotates about a shaft center 118A of a offset rotating shaft 118 to apply a shear force on a release surface of the workpiece W, thus improving the release performance and reduce possibilities of damaging the workpiece W.

In this embodiment, the material tank 11 is used to store a photo-curable material, and the material tank 11 includes a light-transmissive plate 111, a main frame 112, a support frame 113, a peeling film 114 and a rotating shaft 118.

In this embodiment, the photo-curable material is in a liquid state or gel formation and may produce a photochemical reaction when irradiated by light of specific wavelengths. The light of specific wavelengths may be ultraviolet or visible light. In this embodiment, the photo-curable material may be a photopolymer, light-activated resin or photosensitive resin that can be cured by ultraviolet radiation having a wavelength of about 365 nm.

In this embodiment, the light-transmissive plate 111 allows visible light or invisible light, at least in part, to pass therethrough. The light-transmissive plate 111 may be made from glass or high-molecular-weight plastic. In this embodiment, the light-transmissive plate 111 is a glass plate. Further, for ultraviolet radiation having a wavelength of 365 nm, a competent, more preferable and best performance of the light-transmissive plate 111 requires a transmittance of above 70%, 80%, 90% and 95%, respectively. Further, in this embodiment, the material with a thickness of 1 cm forming the light-transmissive plate 111 may achieve a competent, preferable, more preferable and most preferable performance of the light-transmissive plate 111 under a transmittance of above 70%, 80%, 90% and 95% for 365 nm wavelength light. In this embodiment, the light-transmissive plate 111 achieves a transmittance of about 96% for ultraviolet radiation having a wavelength of 365 nm. Besides, in case the photo-curable material is cured by visible light, the light-transmissive plate 111 may achieve a transmittance of above 90% for visible light. In one embodiment, for 500 nm visible light, a competent, preferable, more preferable and best performance of the light-transmissive plate 111 requires a transmittance of above 70%, 80%, 90% and 95%, respectively. In this embodiment, a glass plate serving as the light-transmissive plate 111 achieves a transmittance of about 92% for 500 nm visible light.

In this embodiment, the main frame 112 is used to support the light-transmissive plate 111 and directly or indirectly restricts the movement of the light-transmissive plate 111 by fiction or an interference structure such as a bump. The main frame 112 may be a block or a plate with any desired shape, or a structure constructed by at least one block and at least one plate. In this embodiment, the main frame 112 is a rigid and hollow rectangular plate, and a light-transmitting opening that may optionally match the light-transmissive plate 111 in shape is formed on the bottom of the main frame 112.

In this embodiment, the support frame 113 is a movable mechanical element for transmitting power or changing the direction of motion. For example, the support frame 113 may rotate or tilt about a fixed axis or may perform reciprocating motion. In this embodiment, the support frame 113 is a substantially rigid rectangular plate and has a reduced thickness. The plate is provided with at least one through hole that penetrates the entire thickness of the plate and may match a rotating shaft in size. Further, the top surface of the support frame 113 is provided with multiple screw holes extending in a vertical direction to fit with screws, so that some mechanical elements such as screws may be inserted in the screw holes to secure or connect the support frame 113 with the main frame 112.

In this embodiment, the peeling film 114 may be a transparent soft film having low viscosity and can advantageously be used to separate and release a workpiece W from a glass surface. In this embodiment, the peeling film 114 is a Teflon film.

In this embodiment, the rotating shaft 118 is used to transmit power and support other rotational components, and a shaft center 118A of the rotating shaft 118 coincides with a centroid of a cross-section of the rotating shaft 118.

Figure 2:
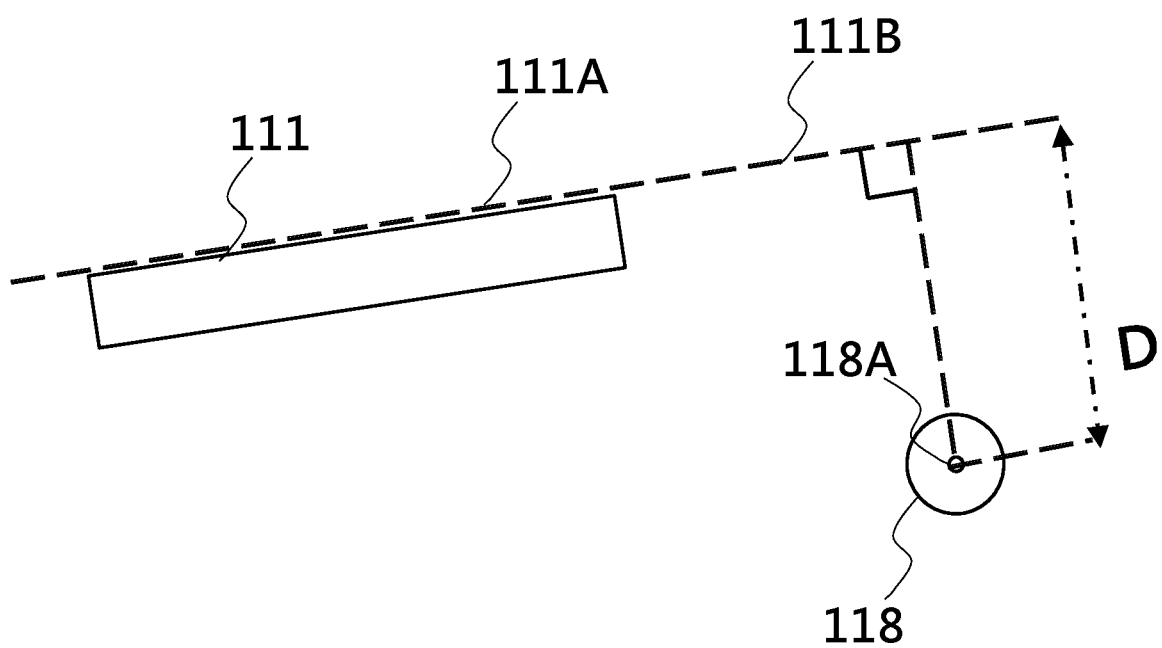
FIG. 2 shows a schematic diagram illustrating the positional relationship between a shaft center of a rotating shaft and an extending plane extending from a surface of a light-transmissive plate.

In this embodiment, the light-transmissive plate 111 is mounted on the main frame 112, and the support frame 113 and the main frame 112 are connected with each other by screws and move together. In other embodiment, multiple elastic members such as resilient material blocks or springs (not shown) are disposed between the light-transmissive plate 111 and the support frame 113. Therefore, the light-transmissive plate 111 may be directly or indirectly connected with the support frame 113 without limitation. In this embodiment, a first end of the support frame 113 is connected to the light-transmissive plate 111 via the main frame 112, and a second end of the support frame 113 opposite the light-transmissive plate 111 pivots on the rotating shaft 118 via a through hole. Alternatively, the rotating shaft 118 may pivot on a point inside the support frame 113. The shaft center 118A or a rotation center of the rotating shaft 118 is located under an extending plane 111B extending from a surface (such as the top surface 111A) of the light-transmissive plate 111. In this embodiment, a minimum distance D is defined as the shortest distance between a point of the extending plane 111B and the shaft center 118A of the rotating shaft 118, measured in a direction perpendicular to the top surface 111A and the extending plane 111B. Further, the direction perpendicular to the top surface 111A or the extending plane 111B as described above may be referred to as a normal direction of the top surface 111A or the extending plane 111B. When the minimum distance D is set to be larger than a predetermined value, it may facilitate the process of releasing a workpiece W form the peeling film 114. This is because, except for a force component applied in a normal direction of the workpiece W, another force component including a shear force is also induced to aid the release of the workpiece W, as shown in FIG. 2. A competent effect of facilitating the release is achieved when the minimum distance D is equal to or larger than 3 cm, a preferable effect is achieved when the minimum distance D is equal to or larger than 5 cm, and a best effect is achieved when the minimum distance D is equal to or larger than 6 cm. Moreover, the minimum distance D is preferable no more than 50 cm based on the consideration of fabrication costs.

In this embodiment, two ends of the rotating shaft 118 are movably disposed on a housing or frame (not shown) of a printing apparatus. In other embodiment, the rotating shaft 118 is fixed on a housing or frame of a printing apparatus. The above two arrangements of the rotating shaft 118 may exchange without limitation. Further, in this embodiment, the rotating shaft 118 is disposed under the light-transmissive plate 111, but the invention is not limited thereto. The rotating shaft 118 may be disposed above the light-transmissive plate 111 to achieve similar effects.

In this embodiment, the actuator 16 may be a motor, a compressor, or a hydraulic cylinder. In one embodiment, the actuator 16 may include an electric motor and some mechanical elements such as gears, wheels or belts. In this embodiment, the actuator is a motor.

In this embodiment, the actuated element 17 may be a hinge, lever, rod, gear, wheel, pulley, etc. Besides, the actuated element 17 may be one of various types of controlling mechanical elements to determine motion types or transmit power. The controlling mechanical element may be, for example, a spring, a lever, a brake or a clutch. Alternatively, the actuated element 17 may include a combination of at least two mechanical elements described above. In this embodiment, the actuated element 17 is an extensible rod that includes multiple mechanical elements and can be lengthened or shortened according to actual demands.

In this embodiment, the image light source 12 may be a projector having a projection lens or a portable electronic device such as a mobile phone with a display panel. In this embodiment, the image light source 12 is a projector including an ultraviolet light source, a light valve and a projection lens. The ultraviolet light source outputs illumination light, and the light valve such as a DMD converts the illumination light into image beams to be output by the projection lens.

In this embodiment, the workpiece holder 13 may function as a platform to support and hold the workpiece W in position and is actuated to move up and down. Further, the workpiece holder 13 may have a formation surface 131 to allow a photo-curable material to be cured thereon. In one embodiment, the formation surface 131 is a bottom surface of the workpiece holder 13 facing the light-transmissive plate 111.

In this embodiment, the drive device 15 includes an extensible rod, a rotating shaft and a motor. The motor may link and adjust the length of the extensible rod via a transmission assembly inside the rotating shaft 118 and hence enables the workpiece holder 13 connected with the extensible rod to move up and down. Therefore, during operation, the drive device 15 is coupled to the workpiece holder 13 and enables the workpiece holder 13 to move towards and away from the light-transmissive plate 111.

In this embodiment, the supporting seat 14 is disposed under the material tank 11 to maintain a sufficient height of the material tank 11 relative to a supporting surface of the three-dimensional printing apparatus 1, and thus ensures an accommodation space for accommodating the image light source 12 between the material tank 11 and the supporting surface of the three-dimensional printing apparatus 1. In this embodiment, the supporting seat 14 may be in the form of a shallow dish, a box with a light exit or an opening, a housing of the three-dimensional printing apparatus 1, or the support frame 113. In case the support frame 113 also serves as a supporting seat 14, the support frame 113 may be a block structure with strip textures having the function of supporting or receiving an object. In this embodiment, the supporting seat 14 is a rigid box with a light exit, and the light exit may be a through hole or formed by a light-transmissive material.

In this embodiment, the main frame 112 is attached to a surface of the support frame 113 by screws. In a printing process of the three-dimensional printing apparatus 1, first, a photo-curable material is disposed on a peeling film 114 of the material tank 11, and then the drive device 15 actuates the workpiece holder 13 to enable the workpiece holder 13 to move towards the light-transmissive plate 111, such that a formation surface 131 of the workpiece holder 13 is immersed into the photo-curable material. Subsequently, the image light source 12 transmits, directly or indirectly, image beams to the light-transmissive plate 111 by an optical element such as a reflective mirror, and the image beams pass the light-transmissive plate 111 and arrive at the photo-curable material in the material tank 11 to cure the photo-curable material. Therefore, the photo-curable material is cured on the formation surface 131 of the workpiece holder 13 to serve as a part of the workpiece W. Then, the workpiece holder 13 moves away from the light-transmissive plate 111, and meanwhile the actuator 16 actuates the extensible rod of the actuated element 17 to shorten the extensible rod and thus allow the support frame 113 to counterclockwise rotate about the rotating shaft 118. When the support frame 113 rotates, the main frame 112 may force the peeling film 114 to move and cause the peeling film 114 to apply an oblique component of force (including a shear force) on the workpiece W, thus facilitating the release of the workpiece W from the peeling film 114. The processes of moving the workpiece holder 13 up and down, curing the material and releasing the workpiece are repeatedly performed to finally form a 3D printed object.

Though the embodiments of the invention have been presented for purposes of illustration and description, they are not intended to be exhaustive or to limit the invention. Accordingly, many modifications and variations without departing from the spirit of the invention or essential characteristics thereof will be apparent to practitioners skilled in this art. For example, the power transmission may be achieved by direct contact, indirect contact (via rigid or non-rigid intermediate objects) or actions at a distance (such as a magnetic force). Further, a connection between two elements is not limited to a direct direction and may be alternatively realized by the use of an intermediate object, such as a movable mechanical element, a controlling mechanical element, or a connection mechanical element, without influencing the power transmission. Therefore, unless limited otherwise, the terms "connected," "coupled," and "mounted" and variations thereof herein are used broadly and encompass direct and indirect connections, couplings, and mountings. It is intended that the scope of the invention be defined by the claims appended hereto and their equivalents in which all terms are meant in their broadest reasonable sense unless otherwise indicated.

What is claimed is:

1. A three-dimensional printing apparatus, comprising:
    a light-transmissive plate having a first surface;
    a workpiece holder disposed on a first side of the light-transmissive plate;
    a supporting seat disposed on a second side of the light-transmissive plate and defining an accommodation space for accommodating an image light source;
    a rotating shaft having a shaft center, a minimum distance measured in a direction perpendicular to the first surface and between the shaft center and an extending plane extending from the first surface being larger than 3 cm; and
    a mechanical element, a first end of the mechanical element being connected to the light-transmissive plate, and a second end of the mechanical element pivoting on the rotating shaft.

2. The three-dimensional printing apparatus as claimed in claim 1, wherein the mechanical element is a support frame disposed under the light-transmissive plate.

3. The three-dimensional printing apparatus as claimed in claim 1, further comprising:
    a main frame configured for supporting the light-transmissive plate and having a light-transmitting opening.

4. The three-dimensional printing apparatus as claimed in claim 3, wherein the mechanical element is connected to and moves together with the main frame.

5. The three-dimensional printing apparatus as claimed in claim 3, further comprising:
    an actuator and an actuated element, wherein the actuated element is connected with the actuator and the main frame.

6. The three-dimensional printing apparatus as claimed in claim 1, further comprising:
    a main frame, a first end of the main frame being connected with the light-transmissive plate and a second end of the main frame being connected with the mechanical element;
    an image light source disposed in the accommodation space and comprising a light source, a light valve and a projection lens;
    an actuator; and
    an actuated element connected with the actuator and the main frame.

7. The three-dimensional printing apparatus as claimed in claim 6, wherein the workpiece holder is disposed above the light-transmissive plate and functions as a platform, and the actuator is a motor.

8. The three-dimensional printing apparatus as claimed in claim 6, wherein the actuated element is an extensible rod.

9. The three-dimensional printing apparatus as claimed in claim 8, wherein the mechanical element rotates about the rotating shaft when the length of the extensible rod varies.

10. The three-dimensional printing apparatus as claimed in claim 1, wherein the light-transmissive plate is a glass plate, a transmittance of the light-transmissive plate for 365 nm wavelength light is above 80%.

11. The three-dimensional printing apparatus as claimed in claim 1, wherein the minimum distance is in the range between 6 cm and 50 cm.

12. A three-dimensional printing apparatus, comprising:
   a light-transmissive plate having a first surface;
   a platform disposed above the light-transmissive plate;
   a support frame disposed under the light-transmissive plate;
   a supporting seat being disposed under the support frame and defining an accommodation space under the light-transmissive plate for accommodating an image light source; and
   a rotating shaft pivoting on a point inside or on the support frame and having a shaft center, the shaft center being disposed under an extending plane extending from the first surface of the light-transmissive plate, and a minimum distance measured in a direction perpendicular to the first surface and between the shaft center and the extending plane extending from the first surface being larger than 3 cm.

13. The three-dimensional printing apparatus as claimed in claim 12, further comprising:
   a main frame configured for supporting the light-transmissive plate and having a light-transmitting opening.

14. The three-dimensional printing apparatus as claimed in claim 13, wherein the support frame is connected to and moves together with the main frame.

15. The three-dimensional printing apparatus as claimed in claim 13, further comprising:
   an actuator and an actuated element, wherein the actuated element is connected with the actuator and the main frame.

16. The three-dimensional printing apparatus as claimed in claim 12, further comprising:
   a main frame, a first end of the main frame being connected with the light-transmissive plate and a second end of the main frame being connected with the support frame;
   an image light source disposed in the accommodation space and comprising a light source, a light valve and a projection lens;
   an actuator; and
   an actuated element connected with the actuator and the main frame.

17. The three-dimensional printing apparatus as claimed in claim 16, wherein the actuator is a motor.

18. The three-dimensional printing apparatus as claimed in claim 16, wherein the actuated element is an extensible rod, and the support frame rotates about the rotating shaft when the length of the extensible rod varies.

19. The three-dimensional printing apparatus as claimed in claim 12, wherein the light-transmissive plate is a glass plate, a transmittance of the light-transmissive plate for 365 nm wavelength light is above 80%.

* * * * *